United States Patent [19]

Voitsekhovsky et al.

[11] 4,432,695

[45] Feb. 21, 1984

[54] WIND MOTOR

[75] Inventors: Bogdan V. Voitsekhovsky; Mikhail B. Voitsekhovsky, both of Novosibirsk, U.S.S.R.

[73] Assignee: Institut Gidrodinamiki Imeni M.A. Lavrentieva, Novosibirsk, U.S.S.R.

[21] Appl. No.: 316,494

[22] Filed: Oct. 29, 1981

[51] Int. Cl.³ ............................................. F03D 1/06
[52] U.S. Cl. .................................. 416/17; 416/196 A
[58] Field of Search .......... 416/11, 41 A, 187, 196 A, 416/238

[56] References Cited

U.S. PATENT DOCUMENTS

| | | | |
|---|---|---|---|
| 320,654 | 6/1885 | Harrison | 416/122 A X |
| 725,829 | 4/1903 | Decker | 416/41 A |
| 741,515 | 10/1903 | Lowe | 416/196 A X |
| 869,709 | 10/1907 | Homola | 416/122 A X |
| 1,883,336 | 10/1932 | Chillingworth | 416/238 |
| 2,516,576 | 7/1950 | Jacobs | 416/238 X |
| 2,661,068 | 12/1953 | Gaskill | 416/196 A X |
| 4,159,191 | 6/1979 | Graybill | 416/11 |
| 4,353,702 | 10/1982 | Nagy | 416/132 B X |
| 4,360,315 | 11/1982 | Olson | 416/41 A |
| 4,368,007 | 1/1983 | Ely | 416/238 |

FOREIGN PATENT DOCUMENTS

| | | | |
|---|---|---|---|
| 2523180 | 2/1977 | Fed. Rep. of Germany | 416/238 |
| 2806874 | 8/1979 | Fed. Rep. of Germany | 416/196 A |
| 909378 | 5/1946 | France | 416/11 |
| 1038090 | 9/1953 | France | 416/11 |
| 182740 | 7/1922 | United Kingdom | 416/240 A |

Primary Examiner—Everette A. Powell, Jr.
Attorney, Agent, or Firm—Burgess, Ryan & Wayne

[57] ABSTRACT

A wind motor is disclosed wherein mounted on a support structure is a shaft carrying a rotor comprising blades connected with the shaft and extending longitudinally relative thereto at an angle to the longitudinal axis thereof. Each of the blades is connected to the shaft through a girder having the shape of a triangular pyramid with one of the rods making up this pyramid extending from an apex thereof along the longitudinal axis of the blade to be connected therewith and with the end of the shaft at the outlet of the windstream, whereas two other rods extending from this apex are secured on a hub positioned at the end of the shaft which faces the windstream tangentially to this hub.

6 Claims, 14 Drawing Figures

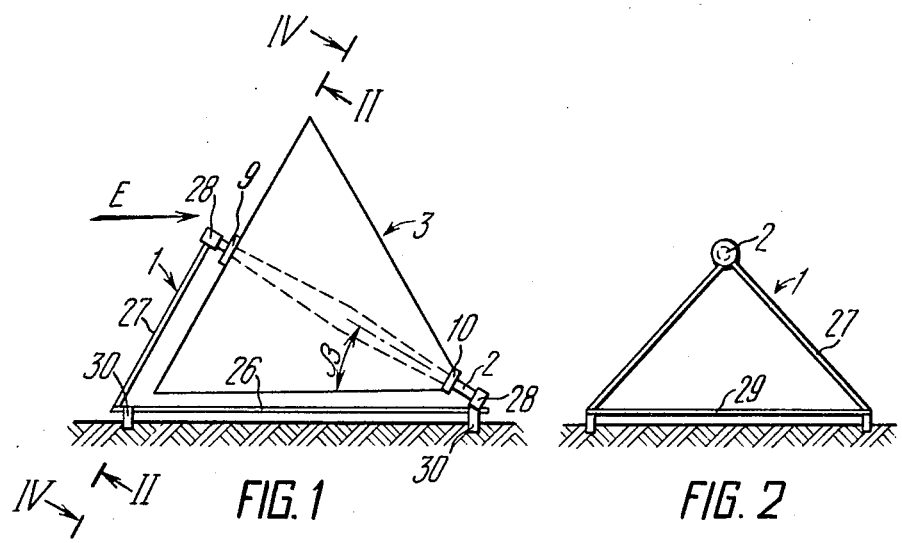
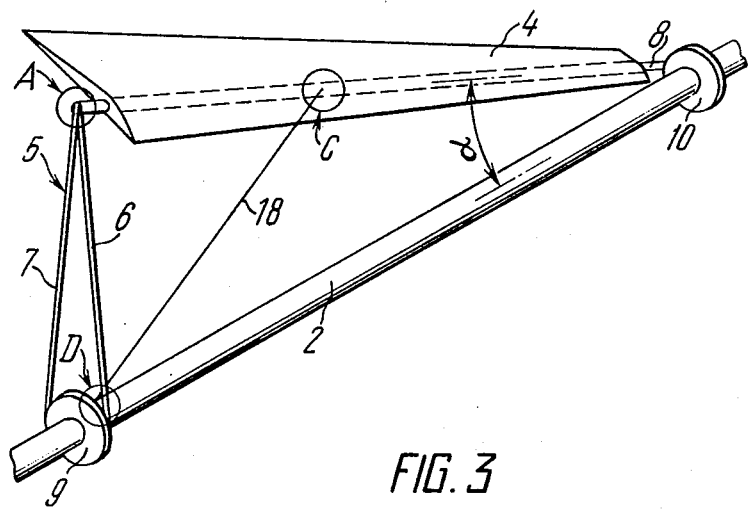

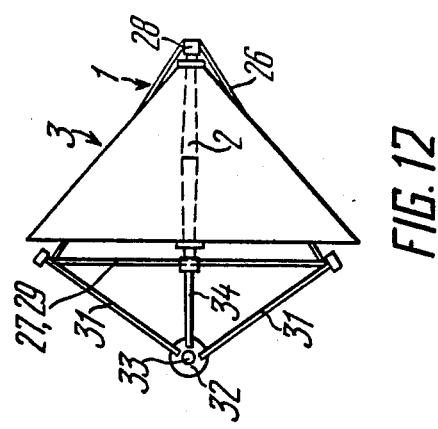
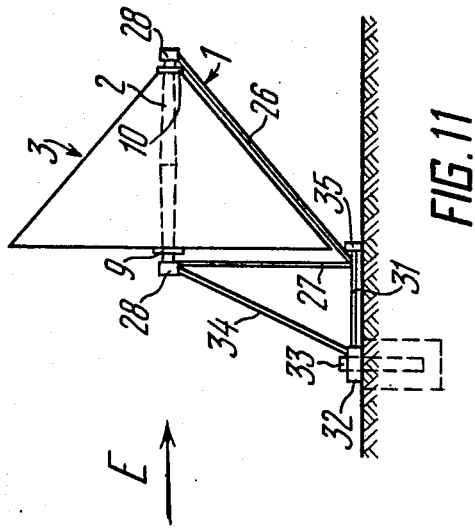
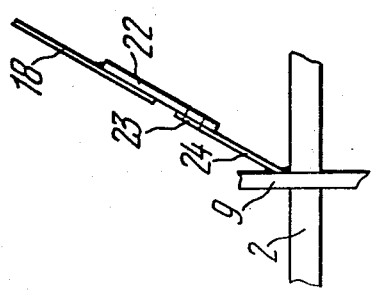

WIND MOTOR

The present invention relates to power engineering, and more particularly to wind motors.

A wind motor according to the invention may be installed in locations where wind forces range between 1 m/s and 40 m/s.

Primarily, the wind motor according to the invention may be installed in areas remote from electric power lines. When provided with means for converting mechanical energy into electrical, it can find application in conjunction with a local diesel power plant to result in fuel economy. Especially advantageous is the use of the proposed wind motor in water pumping for melioration. Clusters of such wind motors can be used in power-intensive chemical processes admitting of the application of variable power, such as for producing nitric acid from the air by the so-called "Norwegian method" and for producing hydrogen by electrolysis.

When gathered in groups or clusters with a total power of several thousand kilowatts, the proposed wind motors may be connected to electric power lines for operation jointly with hydroelectrical power stations and thermal power plants.

At high winds the wind motor produces considerable amount of electric power which can be accumulated and spent at will. At a low wind speed of close to 1 m/s the power produced by the wind motor will be negligeable yet sufficient for carrying small loads, such as feeding weak-current equipment, standby lighting or a telephone line.

One wind motor is known (cf. W. German Pat. No. 2,642,570) having a rotor secured on a support structure, the rotor being defined by rods extending in radial directions from a hub attached to a rotor shaft, the rods being secured in place by means of braces, and by vanes and cables interposed between two adjacent rods. The rods have the form of shaped masts and are provided with guides for securing the vanes.

An advantageous aspect of the above invention resides in that by using the braces a transfer from "planar" to three-dimensional framework is thereby made. The wind motor according to the above described W. German Pat. No. 2,642,570 is intended for use in locations with relatively slow wind speeds.

Another prior art wind motor (cf. U.S. Pat. No. 4,159,191) is known to comprise a rotor secured on a shaft which is capable of swivelling on a support in the form of a vertical post. The rotor is comprised of two rings of different diameters positioned coaxially relative to the shaft. Secured between the rings are blades extending longitudinally and radially inward from the larger ring to the smaller ring. The rings are connected with the shaft by means of cruciform struts or braces extending radially from the shaft. The length of each of the blades exceeds the radius of the larger ring.

One advantage of the above wind rotor resides in an increase in power per unit area of the windstream covered by the larger rotor ring as compared with planar rotors.

The above prior art rotor is secured to a shaft mounted for swivelling about a vertical stand; the rotor blades are attached directly to the front and rear rings and are capable to change the gap between the blades to regulate the passage of the windstream therethrough; parts of the rings between the struts are subjected to bending loads and to eliminate the loads it is necessary to impart greater strength to the rings by enlarging its cross-section which entails a growth in the weight thereof.

The elongated blades are also subject to considerable bending moments during high winds. This requires that the cross-section of the blades be likewise increased resulting in heavier weight thereof. This disadvantage is obviated by turning the blades which calls for the employment of spring elements making the whole structure more expensive.

Also known is a wind motor (cf. French Pat. No. 1,290,018) wherein a support structure has the form of separate tetrahedral posts with the lower ends thereof secured on a substructure. Ends of a rotor shaft are attached to these posts.

The construction of this wind motor fails to utilize the space underlying the rotor to accommodate the posts, which makes the whole structure susceptible to overturning moments under the action of high winds. The thus reduced space occupied by the base of the structure results in increased loads imparted to the posts and consequently requires that their thickness and, therefore, weight be increased.

It is an object of the present invention to increase the strength of power frame of a rotor and that of a support structure carrying the rotor to improve the resistance of a wind motor to high winds.

It is another object of the invention to reduce the cost of 1 kW of installed power and 1 kW/h of electrical energy produced by the wind motor according to the invention.

Another object of the invention is to provide a support structure posessing of sufficient spatial rigidity.

Stil another object of the invention is to provide a wind motor which is simple to construct and easy to maintain.

One more object of the invention is to provide such a wind motor construction which would enable to combine strength and rigidity of structure with relatively low weight and consequently low cost.

These objects are attained by that in a wind motor comprising a support structure bearing a shaft carrying a rotor having blades connected with the shaft and extending longitudinally relative thereto at an angle to the longitudinal axis thereof, according to the invention, each of the blades is connected to the shaft through a girder having the shape of a triangular pyramid with one of the rods extending from an apex thereof along the longitudinal axis of the blade to be connected therewith and with the end of the shaft at the outlet of the windstream, whereas two other rods extending from this apex are secured on a hub positioned at the end of the shaft which faces the windstream tangentially to this hub.

Preferably, additional rods are provided adapted to connect midpoints of the rods carrying the blades with the rotor shaft.

The provision of the additional rods enables to reduce the bending moment to which the blades are subjected at high winds.

Preferably, the apexes of the triangular pyramids connecting the blades with the rotor shaft are also connected therebetween by rods to form a polygon.

This connection of the apexes of the triangular pyramids imparts greater rigidity to the frame of the rotor and is intended to resist the effect of tangential forces directed perpendicularly to the radius of the rotor.

It is further preferable that the edge of each of the blades be connected by a rod with the apex of the triangular pyramid connecting an adjacent blade with the rotor shaft.

This arrangement enables by controlling the length of the rod to adjust the angle of attack of the blade relative to the windstream.

It is preferred that the support structure carrying the rotor shaft would include a girder shaped as a triangular pyramid, one of the rods making up the pyramid and connecting its apex with a base thereof serving as the rotor shaft being connected with adjoining rods for rotation relative to these rods.

This affords to employ the wind motor during strong low winds, when the wind speed reaches as high as 40 m/s. Being one of the edges of the triangular pyramid, the rotor shaft functions as a beam supported at two ends thereof. Securing the rotor shaft at the two apexes of one triangular pyramid increases the resistance of the wind motor assembly to overturning moments arising at high winds, as compared with an arrangement wherein such a shaft is secured at two apexes of two different pyramids.

Such an arrangement of the support structure is necessary to take off the power produced by the wind motor more efficiently without resorting to reduction gear; the rotor of the wind motor functioning in this case as a generator rotor, the stator being secured on the support structure.

Alternatively, the rod of the triangular pyramid which serves as the rotor shaft may be positioned horizontally, for which purpose the triangular pyramid is turned relative to one of the rods making up its base; an additional girder may also be provided having a base of triangular configuration, one of the rods making up this base being in coincidence with the rod making up the base of the triangular pyramid relative to which it is turned, an apex of the base of the additional girder opposite to this rod being connected by a rod with the apex of the triangular pyramid carrying the rotor.

This arrangement enables to reduce the area occupied by the wind motor assembly.

The wind motor according to the invention features resistance to high winds, structural simplicity, ease of manufacture and reliability in operation. It may be used with winds of high and low speed.

The invention will now be described in greater detail with reference to preferred embodiments thereof taken in conjunction with the accompanying drawings, in which:

FIG. 1 is an elevation of a wind motor according to the invention;

FIG. 2 is a section taken along line II—II of FIG. 1;

FIG. 3 shows an isometric view of a triangular pyramid connecting blades with a shaft;

FIG. 10 is an enlarged view of the section "D" in FIG. 3;

FIG. 11 is a side elevation of a modified form of the wind motor featuring a horizontally disposed rotor shaft and capable of swivelling about a vertical axis;

FIG. 12 is a top plan view of FIG. 11;

Figure 4:
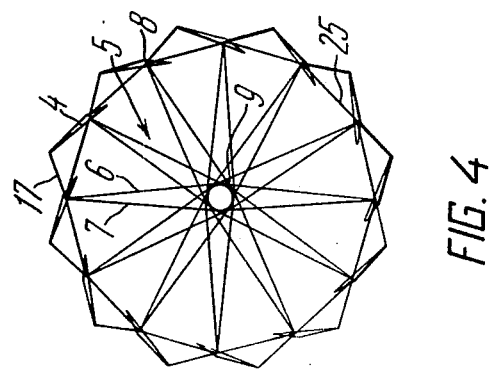
FIG. 4 is a section taken along line IV—IV of FIG. 1.
Figure 7:
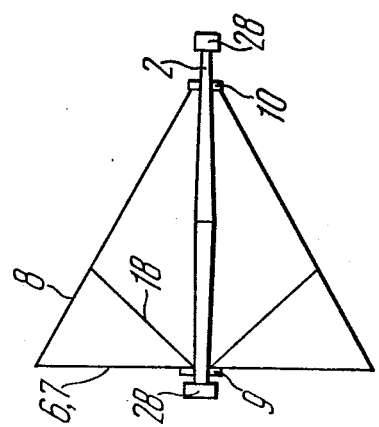
FIG. 7 is an axial section of the rotor with blades removed.

FIGS. 4 and 7 may give a false impression as though they show diagrams but not drawings due to the fact that rods of the power frame of the rotor are indicated by single and not double lines. The cross-sections of the rods 6, 7 and 18 being 1/200 and those of the rods 8 only between 1/80 and 1/100 of the diameter of the larger end face of the rotor, these rods are practically impossible to illustrate in FIGS. 4 and 7 by double lines maintaining the proper relative scale. Attempts to do just that would result in the width between the double lines showing the rods of less than 0.5 mm, while the line thickness would be in the order of several hundredths of one millimeter. It should be noted, however, that the construction of the proposed rotor affords, despite the relatively small cross-section of the rods, to impart a sufficiently high spatial rigidity and strength to the power frame of the rotor, which is one of major advantages of the proposed rotor. To distort the scale to show more clearly the rods making up the power frame for the sake of indicating these rods by double lines is not advisable, since such drawings would create a false impression that the rods substantially hamper or drag the windstream passing therethrough (when, in fact, the total drag area of the rods 6, 7 and 18 is negligeable, viz. below 0.05 of the area of the larger end of the rotor).

Referring now to FIGS. 1 and 2, there is shown a wind motor which comprises a support 1 having arranged thereon a shaft 2 carrying a rotor 3 (FIG. 1). The rotor 3 is comprised of a plurality of hollow blades 4 (FIGS. 3 and 4) disposed circumferentially and connected with the shaft 2 by way of tapered girders 5 forming triangular pyramids indicated by the same numeral 5, each of the pyramids being defined by rods 6, 7 and 8 and the shaft 2. The rods 6, 7 and 8 are united at an apex spaced away from the end of the shaft 2 on the side of the rotor facing the wind, the wind direction being generally indicated by the arrow "E" in FIG. 1. Other ends of the rods 6 and 7 are secured tangentially to a hub 9 mounted on the shaft 2. The rods 8 extend inside the hollow blades 4 at an angle $\alpha$ of 30° to 45° relative to the axis of the shaft 2; (a more complete use is made thereby of the wind power over a rotor of regular shape).

Figure 6:
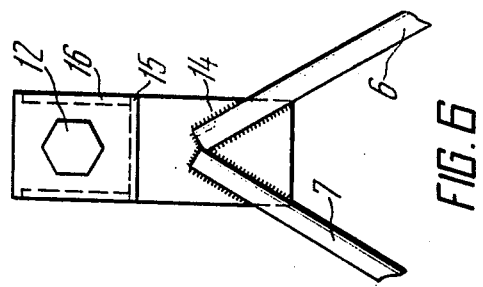
FIG. 6 is a view of FIG. 5 along the arrow B.
Figure 5:
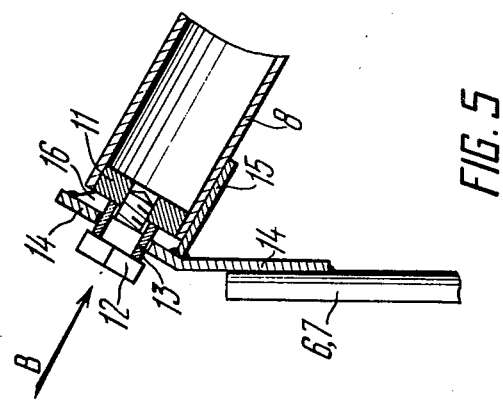
FIG. 5 shows an enlarged view of the section "A" of FIG. 3.

Each of the rods 8 is hollow and is connected by one end thereof with the rods 6 and 7 at the point of their intersection, another end of the rod 8 being connected with a second hub 10 of the shaft 2. The blades 4 are secured to the rods 8 so that their longitudinal axes coincide with the longitudinal axes of the rods 8. The rod 8 is connected with the rods 6 and 7 and with the hub 10 such that it may be turned axially to adjust the angle of attack of the blade 4 relative to the direction of wind leaving the rotor 3. In order to adjust the blade 4 to a required angle, a connection is used comprising a plug 11 (FIG. 5) of the rod 8 receiving a bolt 12 extending through a sleeve 13. The sleeve 13 passes through an opening in a bent plate 14, the latter having welded thereto a plate 15 which in conjunction with side walls 16 serve as a guide for the rod 8, whereas the plate 14 is rigidly connected to the rods 6 and 7 (FIG. 6). Alternatively, other suitable structural means may be employed to adjust the angle of attack of the blade 4.

For fixing the angle of the blades 4 in a preselected position use is made of elements 17 (FIG. 4) linking the edge of each blade 4 at the end thereof facing the wind with the apex of the pyramid 5 of the adjacent blade 4 (FIG. 4).

Figure 9:
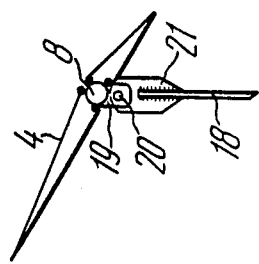
FIG. 9 is a section taken along line IX—IX in FIG. 8.
Figure 8:
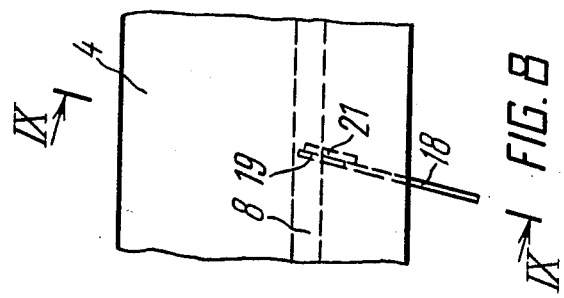
FIG. 8 shows an enlarged view of the section "C" of FIG. 3.

Each rod 8 (FIG. 7) is connected by a point thereof which is in close proximity to the center of gravity of the blade 4 (FIG. 3) to the shaft 2 by way of an additional rod 18 (FIG. 7). Illustrated in FIGS. 8 and 9 is the way the additional rod 18 is connected with the rod 8 for which purpose the blade 4 is provided with a narrow slot to receive a plate 19 (FIG. 9) having an opening 20 for bolted connection with a strap 21 welded to the additional rod 18. Attached to another end of the additional rod 18, such as by welding, is a strap 22 (FIG. 10) having an opening 23 for receiving a bolt (not shown) for linking the strap 22 with a plate 24 welded to the hub 9. Other suitable means of connecting the rod 18 with the rod 8 and the shaft 2 may be employed, for example, the blade 4 may be made up of separate sections.

The rods 18 are provided in order to relieve some of the load imparted to the rods 8. Increased length of the rods 8 (resulting in an elongated rotor) may call for an increase in the number of the additional rods 18 to be employed.

Apexes of the pyramids 5 (FIG. 4) are connected by rods 25 acting to provide uniform distribution of loads therebetween.

The shaft 2 (FIG. 1) of the rotor 3 is part of the support structure 1, the latter having the form of a girder of triangular pyramidal shape indicated by the same numeral 1. The shaft 2 of the rotor 3 extends from the apex of this pyramid 1 toward the base thereof and is united at this base with rods 26, while at the apex the shaft 2 is united with rods 27. The shaft 2 is capable of rotating relative to the rods 26 and 27 in radial thrust bearings 28. The rods 26 and 27 are connected by a rod 29 (FIG. 2). The base of the pyramid defined by the rods 26 and the rod 29 is fixedly secured to a substructure by means of three posts of equal height. Provided the substructure is sufficiently strong, the rods 26 and 29 may be obviated. The heretofore described support structure is preferably used in locations with a stable wind direction, as well as in wind-operated power plants.

The shaft 2 is sloped relative to the base of the triangular pyramid 1 (FIG. 1) at an angle β which is preferably equal to the angle α between the shaft 2 and the blade 4, which provides easy maintenance, viz. any desired blade 4 may be lowered to be parallel to the ground by turning the rotor 3.

Illustrated in FIG. 11 is another embodiment wherein the shaft 2 of the rotor 3 is positioned horizontally, for which purpose the triangular pyramid 1 defined by the rods 26, 27 and 29 (FIG. 12) and the shaft 2 of the rotor 3 is turned relative to the rod 29, whereas for holding this pyramid in a preselected position an additional girder is used having a base of triangular shape formed by rods 31 and 29. The apex of this triangular base is connected to a disk 32 (FIG. 11) adapted to receive a spindle 33; another rod 34 is provided connecting the apex of the triangular base with the end of the shaft 2, i.e. with the apex of the triangular pyramid 5.

The rod 34 may be comprised of two parts telescopically connected therebetween which would enable by varying its length to select the required slope of the shaft 2 relative to the ground.

In order to provide for self-orientation to face the wind, the wind motor is capable of pivoting around the spindle 33. Attached to the ends of the rods 31 which are opposite to the ends thereof secured on the disk 32 are wheels 35 for movement of the wind motor on the ground.

Alternatively, the modification of the wind motor shown in FIGS. 11 and 12 may be fixedly secured to a substructure or may be provided with a system of forced orientation towards the wind. Wind motors having the above support structure are preferably mounted in locations where the area available for mounting such a structure is limited.

Figure 13:
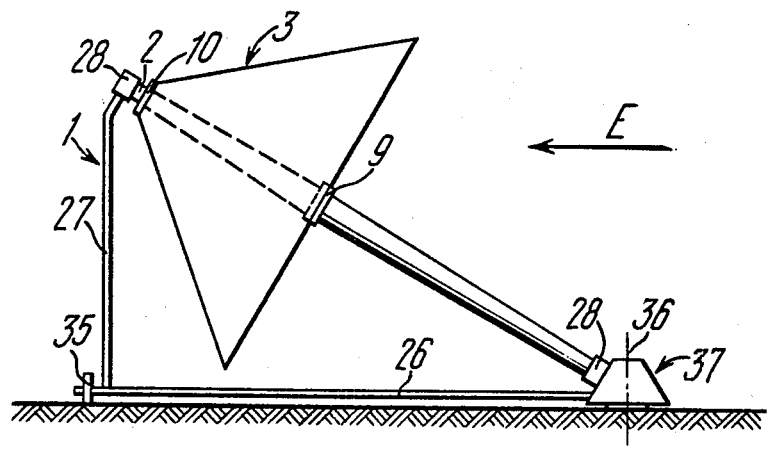
FIG. 13 is a view of the wind motor having a sloped shaft capable of swivelling relative to a vertical axis.

With reference to FIG. 13, there is shown another modified form of the wind motor having a support structure in the form of triangular pyramid 1 capable of pivoting relative to the vertical axis 36 to face the wind motor into the wind. The shaft 2 of the rotor 3 is inclined to the horizontal, whereas the end thereof which is disposed at the side of the rotor facing the wind is positioned close to the substructure and connected to a swivel 37.

Figure 14:
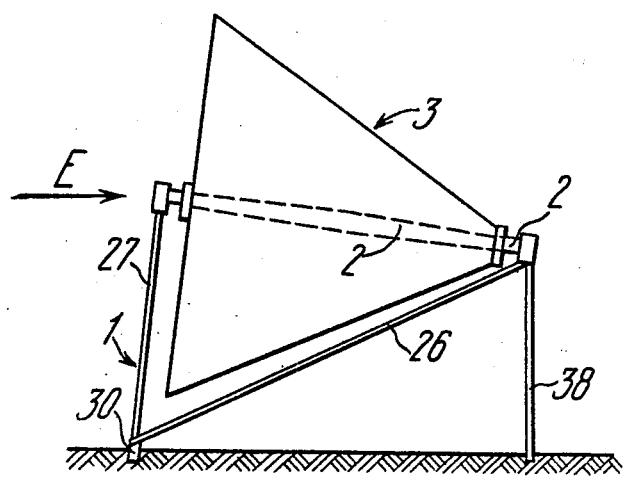
FIG. 14 is a modification of the wind motor with a shaft slightly inclined to the horizontal.

FIG. 14 illustrates one more modification of the wind motor wherein the shaft 2 of the rotor 3 and the rods 26, 27 and 29 define a structure in the form of triangular pyramid 1, one of the edges of the pyramid serving as the shaft 2 of the rotor 3 (the structure is comprised of the rods 26, 27 and 29 and the shaft 2). The support structure may be connected with the substructure by any known suitable means.

The rotor of the wind motor according to the invention may be provided with a small number of blades, such as with two or three blades, each blade 4 being connected with the shaft 2 of the rotor 3 by means of structure 5 of triangular pyramidal shape (FIGS. 3 and 4).

In the description of the operation of the wind motor major attention will be devoted to the work of the power structure whose design constitutes a specific feature of the present invention.

The wind motor illustrated in FIGS. 1 and 2 operates in the following manner.

The windstream, which is generally directed axially of the rotor 3, enters the rotor 3 from the end side thereof having a larger diameter (wind direction is indicated by the arrow "E"). Each of the blades 4 is acted upon by a force which is perpendicular to the surface thereof (lifting action) as well as by a force with is directed longitudinally of the blade surface (frontal resistance). The frontal resistance may be discarded, especially in the case of a multi-blade slow-speed modification with considerable angle of attack, if the aerodynamic efficiency of the blades or the lift-to-drag ratio is high. The above lifting action of the blade 4 is translated into a moment imparting torque to the shaft 2 of the rotor 3. Most of the thus produced tongue is transmitted to the shaft 2 through the rods 6 and 7 and the hub 9 secured on the shaft 2. Therewith, the rod 7 experiences a tensile stress, while the rod 6 is subjected to either a tensile or compressive stress, depending on the angle at which the blade 4 is turned around its geometrical axis passing along the rod 8. Beding stresses in the rods 6 and 7 are not created by virtue of the forces transmitted through the rod 8 articulately connected with the rods 6 and 7. The windstream acting directly on the rods 6 and 7 imparts a negligible bending force thereagainst.

Under the action of the above lifting action, a distributed bending moment arises in the rod 8, the value of this moment being only one-fourth of such a value in a blade secured by one end thereof to the rotor. The lifting action of the blade is counteracted by the rod 18 subjected exclusively to longitudinal tensile stresses, the rod 18 also acting to reduce several fold the loads imparted to the rod 8.

The rods 25 contribute to the uniform distribution of loads between the girders 5 defined by the rods 6, 7 and 8. This is especially important during irregular distribution of forces imparted to the rotor, such as during sudden wind gusts or braking the rotor 4 by the lower peripheral portion thereof with the purpose to stop its rotation. The rods 25 also provide greater structural rigidity to the framework of the rotor.

The rod 17 prevents the blade 4 from turning relative to its longitudinal axis under the action of aerodynamic forces and maintains a preselected angle of attack of the blade. The value of the attack angle is selected depending on the lift-to-drag ratio of the blade 4; the angle is increased at a low aerodynamic efficiency of the blade or at low wind force. A change in the angle of attack is effected by varying the length of the rod 17; the blade 4, the rod 8 and the sleeves 13 secured at the ends of the blade 4 being capsule of rotating relative to the plate 14.

Preliminary estimates for rotors of various diameters have shown that at a thickness of the rods 6, 7 and 18 equalling 1/200 of the diameter of the larger end side of the rotor 3 and at relative thickness of the rods 18 of between 1/100 and 1/80 of said diameter and at a wind force of 40 m/s the stresses in the rods are never in excess of the yield strength of plain low-carbon steel. It follows therefrom that the drag area occupied by the rods 6, 7 and 18 is below 5% of the area of the larger end side of the rotor. Therefore, the power framework of the rotor practically does not affect the passage of the windstream through the rotor.

The stiffness coefficient of the rotor 3 structure is by far above that of other known rotors. The herein proposed construction of the wind motor enables to use its power in conjunction with practically any known means, including the use of the rotor thereof as a rotor of an electric power generator, accommodating at the support structure a stator of such a generator. This becomes possible due to a high spatial rigidity factor of the framework of the rotor 3 and the support structure 1. A possible use of the wind motor according to the invention as a direct-drive generator depends largely on the precision with which the orbiting path of a given point on the framework of the rotor 3 is repeated relative to the support structure 1.

For this purpose let us track the path of a point at which the rods 6, 7 and 8 are united (apex of the pyramid 5) relative to the support structure 1. If the position of this point relative to the support structure is accurately measured at each revolution of the rotor, deflections of this point will be detected which are determined by a total of incidental elastic deformations of the vertical rods 27 of the support structure 1 and those of the rods 6 and 7. The deflections are enhanced by a free play of the radial bearings 28. However, having in view that the rods 27 and the rods 6 and 7 are subjected only to compressive and tensile stresses, the value of resilient deformation is expected to be rather low.

It has been estimated that at a rated wind speed of 10 m/s and the diameter of the larger end side of the rotor 3 of 10 m, the total of resilient deformation will not exceed 1 mm. In other words, if the system of coordinates of the observer is connected with the support structure 1, an observation of a selected point at the apex of one of the pyramids 5 will result in that the observer detects all the repeated orbital paths of this point occupy a thin line of not more than 1 mm in width. A change of this orbital path may occur in response to a sudden gust of wind or when the wind suddenly dies down.

Distribution of the wind force at certain heights over the ground is generally non-uniform. Particularly non-uniform is the wind force close to the ground surface where the application of wind energy is most available. The above heterogeneity of the windstream calls for a very high strength and spatial rigidity of wind motors. The wind motor according to the invention offers a very important advantage residing in its stability to withstand practically any irregular windstreams, such as wind whirls, sudden gusts and heterogeneous streams of wind in various sections of the rotor 3. This has been attained by the structural arrangement of the wind motor in the form of interconnected triangular pyramids 5 with each rod of the structure making up the pyramid acting as a beam supported by the two ends thereof.

During operation longitudinal loads are exerted on the shaft 2 of the rotor 3, the shaft 2 being part of the support structure 1. Compressive forces act upon the shaft 2 when the wind motor according to the invention is embodied as shown in FIG. 1. Conversely, in the modification of the wind motor illustrated in FIGS. 11 and 12 the shaft 2 is subjected to tensile forces.

It has been found most advantageously economically to take off the power produced by the motor directly, without the use of reduction gear. For this purpose the elements of a generator are preferably arranged at the periphery of the rotor 3, viz. at the points where the rods 6 and 7 are converged, and on the support structure 1 such that the rotor 3 would function as a rotor of the generator while the support structure would accommodate a stator thereof. Such direct use of the rotor may prove efficient only if a stable rotation thereof relative to the stator is ensured.

Having in view the foregoing requirements, it is preferable that the rotor shaft be part of the support structure, in other words that the rotor and the support structure form a single integral assembly.

Illustrated in FIGS. 11, 12 and 13 are modifications of the wind motor capable of automatically tracking the direction of the wind. When the direction of the wind changes, the wind motor is caused to pivot on the wheels 35 about the vertical axis for the end side of the rotor 3 having a larger diameter to face the wind, very much like a wind sock does.

The wind motor according to the invention has a considerable margin of strength despite the employment of rather thin rods thanks to the structural arrangement made up of interconnected girders in the form of triangular pyramids. The use of thin rods made it possible to reduce the total weight of the structure. Also, by virtue of the rotor shaft of the wind motor being part of the triangular pyramid, as well as thanks to the rigidity of the power frame of the rotor, the wind motor according to the invention may be used as an electrical generator. The wind motor is inexpensive to construct and easy to maintain.

It follows from the foregoing that the proposed wind motor features relatively low cost of 1 kW of installed power and 1 kW/h of electrical energy produced.

We claim:

1. A wind motor assembly comprising:
a support structure;
a shaft mounted on said support structure for rotating relative to its longitudinal axis;
a rotor arranged on said shaft;
said rotor having blades extending longitudinally of said shaft at an angle thereto, girders in the form of triangular pyramids serving for connecting said blades with said shaft, each of said girders having a first rod extending from an apex of each of said pyramids longitudinally of said shaft at an angle to the longitudinal axis thereof, said first rod passing through said corresponding blade longitudinally thereof connected therewith and with the end of said shaft at the outlet of the windstream, two more rods extending from said apex of said triangular pyramid, a hub secured on the opposite end of said shaft at the side of the rotor facing the windstream, said two rods being secured on said hub tangentially thereto.

2. A wind motor as claimed in claim 1 wherein additional rods are provided connecting midpoints of said first rods of said triangular pyramids carrying said blades with said rotor shaft.

3. A wind rotor as claimed in claim 1 wherein said apexes of said triangular pyramids are interconnected by rods to define a polygon.

4. A wind rotor as claimed in claim 1 wherein the edge of each of said blades is connected by a rod with an apex of a triangular pyramid connecting the adjacent blade with the shaft.

5. A wind motor assembly comprising:
a support structure;
a shaft mounted on said support for rotation relative to its longitudinal axis;
a rotor arranged on said shaft;
said support structure comprising rods having the shape of a triangular pyramid wherein one of the rods making up the pyramid and connecting its apex with a base thereof serves as a shaft of the rotor and is connected with the adjacent rods and is capable of rotating relative to these rods;
said rotor having blades extending longitudinally of said shaft an angle thereto, girders in the form of triangular pyramids serving for connecting said blades with said shaft, each of said girders having a first rod extending from an apex of each of said pyramids longitudinally of said shaft at an angle to the longitudinal axis thereof, said first rod passing through a corresponding blade of said blades longitudinally of its axis connected therewith and with the end of said shaft at the outlet of the windstream, two more rods extending from said apex of said triangular pyramid, a hub secured on the opposite end of said shaft at the side of said rotor facing the windstream, said two rods being secured on said hub tangentially thereto.

6. A wind motor assembly as claimed in claim 5 wherein the rod of the triangular pyramid which serves as the rotor shaft is positioned horizontally for which purpose the triangular pyramid is turned relative to one of the rods making up a base of said pyramid and an additional girder is provided having a base of triangular configuration, one of the rods making up this base being in coincidence with the rod of the base of the triangular pyramid relative to which it is turned, an apex of the base of the additional girder opposite to said rod being connected by a rod with the apex of the triangular pyramid carrying the rotor.

* * * * *